Patented Jan. 12, 1943

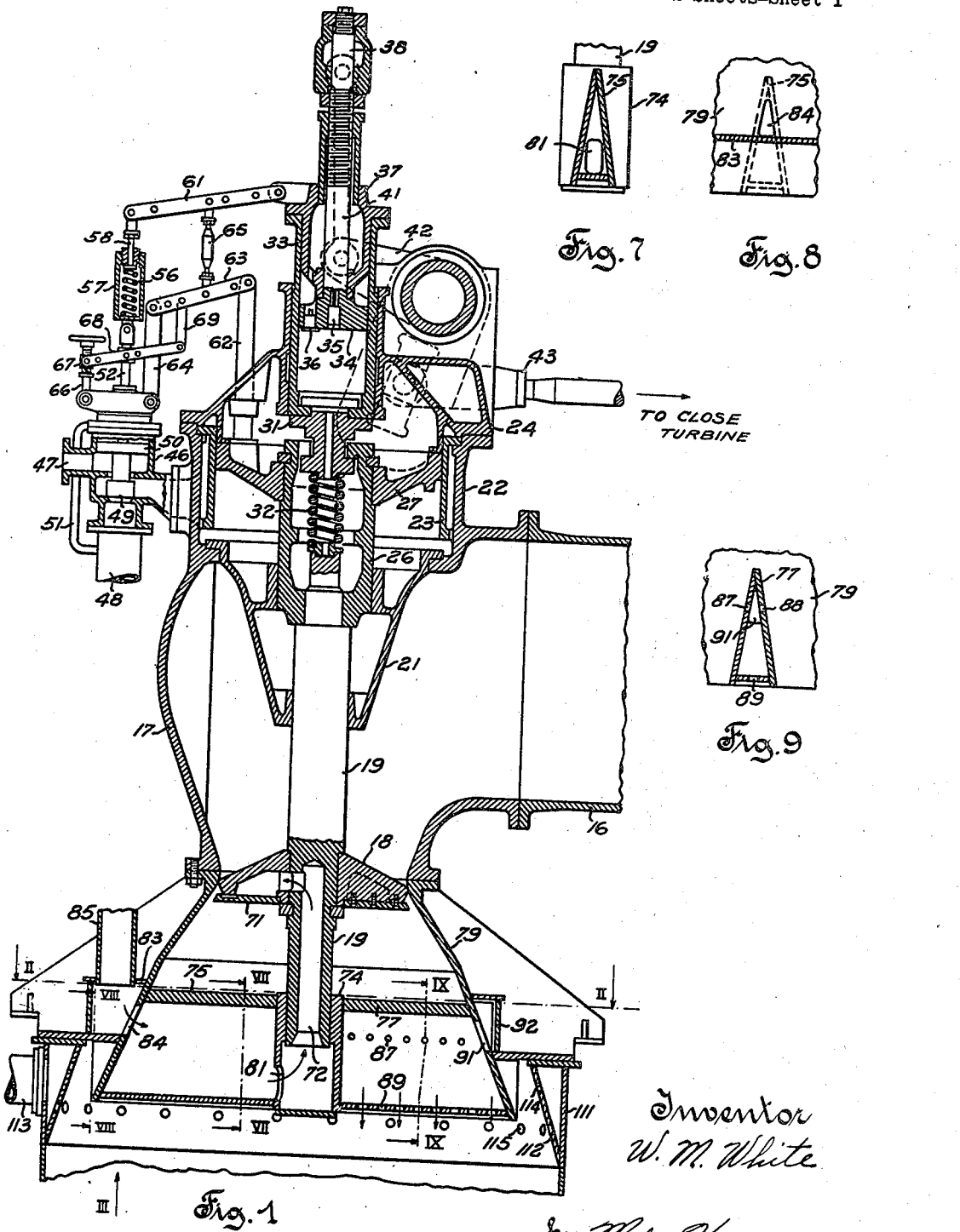

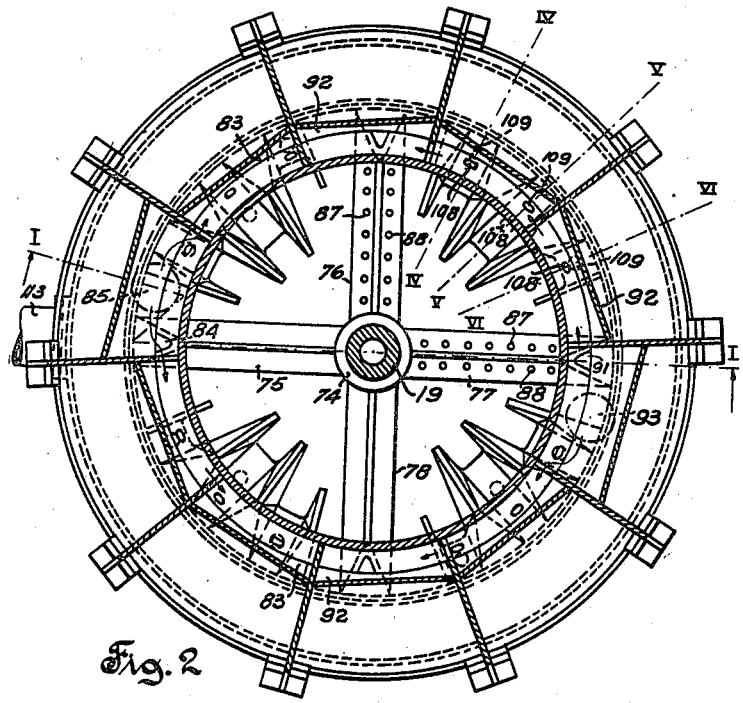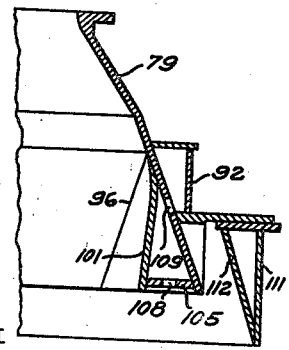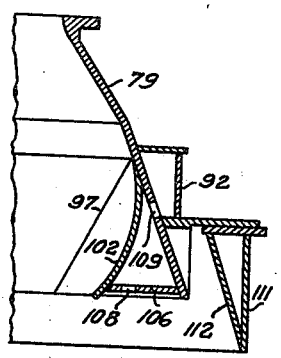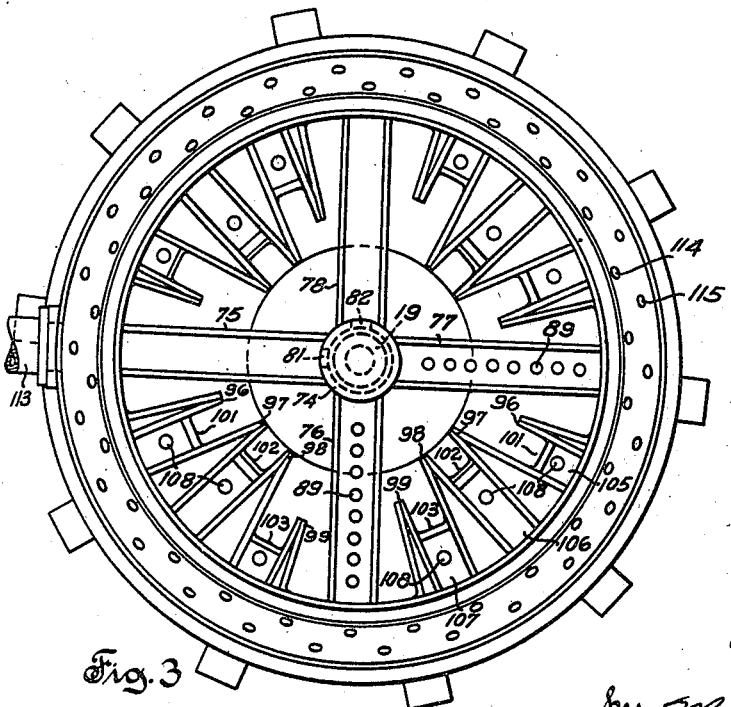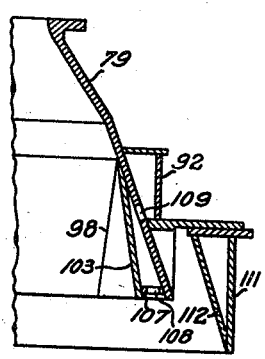

2,308,136

UNITED STATES PATENT OFFICE 2,308,136

ENERGY ABSORBER

William M. White, Milwaukee, Wis.

Original application June 13, 1940, Serial No. 340,315. Divided and this application February 6, 1941, Serial No. 377,607

9 Claims. (Cl. 138—37)

This invention relates to means for absorbing or neutralizing the energy in large quantities of fluid discharged under high pressure as for example from the pressure regulator of a hydraulic power installation.

This application is a division of application Serial No. 340,315, filed June 13, 1940.

The flow of large masses of water involved in a hydraulic power installation, particularly when reaction type turbines are used and when the installation operates under high heads which produce high velocities of flow, cannot be suddenly varied or interrupted without producing pressure waves of such magnitudes as would distort or destroy the various water conduits in which the flow is taking place. Variations or even interruptions of the water flow through a turbine, however, take place even during normal operation of an installation, thus making it necessary to provide a special relief valve which will bypass water around the turbine upon operations of such valve in response to turbine operation causing pressure variations, and hence will regulate the total pressure in the water conduits within predetermined limits. Such pressure regulators are combinations of several devices including the relief valve, the means for operating the relief valve under the various conditions which may arise and the means for harmlessly converting the energy inherent in the discharge of large quantities of water at high velocity, to such forms as will not be dangerous or destructive upon discharge. The present hydraulic power developments employing reaction turbines and operating under hydraulic heads up to 500 feet have shown that means for absorbing the energy inherent in the discharged water must be radically changed to eliminate the noise and vibration now encountered in the operation of pressure regulators under high load or high head.

It is therefore an object of the present invention to provide a pressure regulator for hydraulic power installations in which air is supplied to the discharging water at the points of highest velocity and lowest pressure adjacent the relief valve and throughout the chamber immediately below the valve to prevent the formation of unstable vacua.

Another object of the invention is to provide an energy absorber in combination with a pressure relief valve in which stable hydraulic conditions are produced to avoid the occurrence of noise and vibration upon the operation of the pressure regulator.

Another object of the invention is to provide an energy absorber which will divide the large mass of discharged water into a plurality of relatively small streams from which the energy is separately abstracted.

Another object of the invention is to provide an energy absorber in which the discharge water is divided into a plurality of relatively small high velocity jets discharging into a large body of water moving at a relatively low velocity.

Another object of the invention is to provide an energy absorber in which large masses of water discharge is subdivided into a plurality of relatively small jets produced in opposing pairs impinging on each other substantially without interference from each other.

Objects and advantages other than those above set forth will be apparent from the following description when read in connection with the accompanying drawings, in which:

Fig. 1 is a vertical partially sectional view taken on the plane I—I of Fig. 2, of a pressure regulator embodying the improved operating means, the manual control for the operating means, the means for maintaining stable hydraulic conditions about the pressure regulator and the energy absorber of the present invention;

Fig. 2 is a cross sectional view looking down on a horizontal plane taken on the line II—II of Fig. 1 to illustrate the structure of the energy absorber by which the water passing therethrough is divided into a plurality of relatively small jets and by which air is supplied to the body of the water being discharged to prevent the formation of unstable vacua;

Fig. 3 is a plan view looking upwardly in the direction of the arrow III of Fig. 1 to further illustrate the assembled construction of the various parts making up the energy absorber and air supplying means shown in Figs. 1 and 2;

Fig. 4 is a partially sectional view taken on the plane IV—IV of Fig. 2 to illustrate particularly the curvature of one of the jet forming portions of the energy absorber and a portion of the means for supplying air to such jet;

Fig. 5 is a partial sectional view taken on the plane V—V of Fig. 2 to illustrate the curvature of another of the jet forming portions of the energy absorber and a portion of the means for supplying air thereto;

Fig. 6 is a partial sectional view taken on the plane VI—VI of Fig. 2 to illustrate the curvature of still another of the jet forming portions of the energy absorber and a portion of the means for supplying air thereto;

Fig. 7 is a partial vertical sectional view taken on the plane VII—VII of Fig. 1 to illustrate that portion of the entire structure by which air is conducted to immediately below and about the discharge edges of the pressure regulating valve itself;

Fig. 8 is a view taken on the plane VIII—VIII of Fig. 1 to show that portion of the structure by which air is admitted from an external supply pipe to a conduit conveying air to the central portion of the regulator structure and from thence about the edges of the relief valve itself; and Fig. 9 is a partial vertical sectional view taken on the plane IX—IX of Fig. 2 to illustrate the structure by which air is supplied to the several portions into which the discharged annular jet is divided and to the discharge casing portion below the valve of the pressure regulator.

Referring to the drawings by reference numerals, numeral 16 designates a conduit connected with a source of high pressure fluid in large quantities, such as a penstock or the spiral casing of a hydraulic turbine and in which the fluid flow is subject to rapid variations or to interruption. One end of the conduit 16 is connected with a valve casing 17 shaped substantially as a pipe elbow with the discharge portion thereof directed downwardly and provided with a seat for a valve 18. The valve 18 is preferably substantially formed as a somewhat conical shaped disk, thus producing an annular discharge of fluid about the edges thereof and is mounted on a stem 19 extending from both sides of the valve and guided in its vertical movement by structures mounted in or attached to a portion of the valve casing. The upper end of the valve stem 19 extends through a conical guiding and partitioning member 21 mounted in the valve casing 17 and closing off one end of a cylindrical extension 22 from the upper portion of the casing. The casing extension 22 is provided for a portion of its length with a cylindrical liner 23 and is closed by a top cover or head 24. The upper end of the valve stem 19 has mounted thereon a hollow extension 26 which forms a support for a piston 27 fitting into the cylinder liner 23 and movable therein. The cylindrical casing extension 22 and the liner 23 form the cylinder of a servomotor with its piston 27 mounted on the valve stem for closing the valve upon movement of the piston in response to the admission of fluid pressure to the chamber formed by the cylinder below the piston surfaces. The valve 18 opens downwardly and, being subject to the pressure of the fluid to be discharged, the valve is self-opening and the servomotor 22, 23, 27 is required only to raise the valve 18 to closed position.

The valve stem extension 26 is flanged at the upper end thereof to engage between the flanges of a coupling 31 which flanges are spaced a greater distance than the thickness of the flange on the extension 26, thus providing a lost motion connection under the action of a compression spring 32 acting between the end of the valve stem 19 and the end of coupling 31. The coupling 31 connects with a cylinder 33 movably mounted in the servomotor cylinder head 24 and extending upwardly therefrom. The cylinder 33 receives a piston 34 provided with the usual valves 35 and 36 controlling the flow of fluid through the piston and which valves are preferably adjustable as is well known. The cylinder 33 and the piston 34 together form a dashpot of which both elements are movable. The dashpot piston 34 is provided with a rod 38 extending upwardly through the dashpot cylinder head 37 and pivotally connected with one end of a rod 41 having the other end connected with one arm of a bell crank 42 mounted on the servomotor cylinder head 24. The other arm of the bell crank 42 is connected with a push rod 43 which is in turn connected with means responsive to or related to the pressure variations or to flow interruption in the conduit 16 such as are caused by movement of the shifting ring or governor of a hydraulic turbine (not shown).

The application of fluid pressure from a suitable source such as the conduit 16, to the lower chamber of the servomotor 22, 27 to move the valve 18 to closed position and the discharge of pressure from such chamber to allow the valve 18 to open, are controlled by a control or pilot valve including the valve casing 46 connected with and mounted on the lower servomotor chamber. Fluid pressure is supplied through a port 47 and is discharged through a port 48 of the valve casing under the control of a valve 49 having a piston 50 mounted on the valve stem 52 and operating in a cylindrical portion of the valve casing 46 under the action of pressure for operating the servomotor, to counterbalance the weight of the valve. The chamber above the piston 50 is vented to the valve discharge by a pipe 51. The upper end of the stem 52 of the control valve 49 is provided with a lost motion connection comprising a compression spring 56 in a housing 57 and acted on by a plunger 58 having the upper end connected with one end of a lever 61 pivoted at the other end on the dashpot cylinder 33. A rod 62 is fixedly mounted on the servomotor piston 27 and extends upwardly through the servomotor cylinder head 24. The upper end of the rod 62 is connected with one end of a lever 63 having the other end thereof connected with a link 64 pivoted to a fixed point on the control valve casing 46. A substantially central point of the lever 63 is connected with a substantially central point of the lever 61 by a link 65. A rotatable screw 66 is pivotally mounted at a point on the control valve casing 46 and bears a nut 67 on which is mounted a lever 68 pivotally connected with the control valve stem 52 and having its other end connected by a link 69 with the lever 63. The leverage 61 to 65, inclusive, provides means for operating the control valve 49 responsive to movement of the dashpot cylinder 36 and also restores the control valve 49 to the discharge or closed position upon movement of the servomotor piston 27. The leverage 66 to 69, inclusive, provides a manually operable means for operating the control valve 49 which controls the servomotor 22, 27 regardless of the position of the relief valve 18 or of the operating servomotor and control dashpot and valve above described.

When the relief valve 18 is opened to discharge high pressure water from the conduit 16, the high pressure is converted into high velocity in an annular jet about the edge of the disk 18. Such high velocity produces unstable vacua immediately adjacent the valve 18 which vacua form and collapse at a relatively high frequency to produce vibrations as well as a cracking or pounding noise, both of which effects are disturbing and are evidence of conditions which may be dangerous or even destructive. Such effects may be eliminated by the introduction of compressed air about the edge of the valve 18 which is therefore preferably formed with a hollowed out lower side enclosed by a plate 71 having channels formed adjacent the outer edge thereof to cooperate with the edge portion of the valve. The lower end of the valve stem 19 is bored out to provide a passageway 72 which is connected with the chamber formed between the valve 18 and the plate 71 and is movably guided in the central portion 74 of a spider having four splitter arms 75, 76, 77, 78 mounted in the lower casing portion 79 attached to the valve casing 17. The several splitter arms 75, 76, 77 and 78 are made substantially triangular and extend entirely across the casing portion 79 thus dividing the interior of such casing and also the discharge fluid passing therethrough, into four portions. The spider arm splitters 75 and 78 are connected by apertures as at 81 and 82 with the central spider portion 74 and serve as conduits for compressed air flowing from a manifold 83 extending partially around the casing portion 79 and connected by apertures as at 84 with the spider arm splitters 75 and 78. Compressed air is supplied to the manifold 83 from a suitable source by a pipe 85.

The spider arm splitters 76 and 77 are each provided with a series of apertures 87, 88 in the sides and apertures 89 in the bases of such arms and are connected by apertures 91 with a manifold 92 extending partially around the casing portion 79 and supplying compressed air from a suitable source by way of the pipe 93. It will be seen that the apertures 87, 88 are formed in the sides of the spider arm at the point at which the highest velocity of fluid flow is present and that the apertures 89 are located adjacent the edges from which the fluid is discharged from the splitter arms into the casing portion 79. Air supplied by way of the three series of apertures above described is therefore admitted at the points at which the lowest pressures and highest velocities are present thus preventing the formation of vacua at such points.

The space in each of the four portions defined by adjacent spider arms such as that between the spider splitter arms 76 and 77, is partially filled by similar structures subdividing the quadrant shaped portions of the annular discharge jet flowing between the splitters 76 and 77, into a plurality of jets deflected at different angles across the casing 79, each jet being only a relatively small fraction of the entire mass of water discharged. Each such structure comprises a plurality of splitters 96, 97, 98 and 99 spaced from each other by approximately one-fifth of the length of the arc of the quadrant. The central three spaces between the splitters such as spaces between the splitters 96 and 97, 97 and 98, and 98 and 99 are provided with deflectors as at 101, 102 and 103 which are curved on radii differing from each other and from the inner surface of the casing portion 79 and are held in position by supports 105, 106 and 107 between the casing portion 79 and such deflectors. Due to the different curvature of the several deflectors between the pairs of splitters, the water flowing between each of such pairs of splitters is discharged therefrom at a different angle dependent on the curvature of the deflector. It will be seen that each of the four quadrants into which the casing portion 79 is divided by the splitting spider above described is provided with all of the constructions such as have been described immediately above, which are arranged to provide opposing pairs of jets in each of two of the quadrant portions.

The spaces defined by the splitters, the deflectors and the deflector supports communicate by way of apertures as at 108 through the deflector support 105 with the interior of the casing portion 79 and with apertures as at 109 through the wall of the casing portion 79 to communicate with the manifold 92 to supply air at the discharge edge of the deflectors to prevent the formation and collapse of unstable vacua at such locations. The several jet deflecting structures are similar to each other and are similarly placed so that pairs of jets in opposing quadrants and on diameters through the casing will meet and oppose each other at some point within the casing. It will be understood of course that such meeting and opposing of the jets occur only if the curvatures of the deflectors are so chosen that the jets do not substantially interfere with each other. It will be further understood that the outside jets in each quadrant which flow in contact with the inner surface of the casing portion 79 are not intended to meet and oppose each other within such casing portion. In any event the several jets are discharged into a large relatively slowly moving mass of water in which the energy of the discharge is dissipated in turbulence. It will be understood that the water splitting and jet deflecting structure above described can be applied to structures other than the relief valve shown to absorb the energy in a flow of high velocity water in large masses.

All of the water is discharged from the casing portion 79 into a discharge conduit 111 of substantially greater cross sectional area than the casing portion for the purpose of further dissipating energy and to reduce the turbulence in the discharge water. Such sudden increase in area in a conduit having a flow of water therethrough, however, produces regions in which unstable vacua may form. A sheet metal ring 112 is therefore so placed at the junction of the casing 79 and the conduit 111 as to form a channel to which compressed air is supplied by a pipe 113 and from which such air is discharged through several series of apertures shown at 114 and 115. Air is thus distributed entirely around the periphery of the discharge conduit and prevents the formation of unstable vacua adjacent such periphery.

As long as the conditions of operation of the turbine or other device connected with the conduit 16 do not change, the speed governor or other actuating device for the operating rod 43 does not operate and the pressure regulator remains in the position shown in which the dashpot pressures are balanced and the control valve 49 admits pressure below the servomotor 23 and 27 to hold the relief valve 18 in the raised position against its seat. If a gradual change of condition takes place which causes gradual movement of the rod 43, such movement is transmitted through the crank 42 and the rod 41 to the dashpot piston 34. If the rate of change of dashpot piston position is not beyond the rate at which dashpot pressures remain balanced by flow of fluid through the dashpot piston valves 35 and 36, the position of the dashpot cylinder will remain unchanged and the control valve 49 will remain in the position shown, thus retaining the servomotor piston 27 and the relief valve 18 in the position shown.

However, if a sudden change takes place in the operating conditions of the turbine such as rapid closure of the turbine gate, the usual speed governor moves rod 43 rapidly toward the right and causes a high pressure to be exerted on the dashpot piston 34. The dashpot piston valves 35 and 36 limit the rate at which fluid can pass from below the dashpot piston to above such piston and a pressure is therefore produced in the dashpot cylinder 33 which moves such cylinder downwardly until the play between the flanges of coupling 31 and the flanged end of the valve stem extension 26 is taken up, thereby compressing spring 32. Such downward movement of the dashpot cylinder 33 rocks lever 61 about link 65 as a fulcrum and pulls the control valve stem 52 upwardly to move the control valve 49 into position to shut off the supply of pressure through the passageway 47 and to open the discharge passageway 48. Continued downward pressure of the dashpot cylinder 33 added to the hydraulic head acting on the relief valve causes opening of such valve to discharge pressure from the conduit 16 and also causes discharge of pressure from below the servomotor piston 27. A change in conditions causing reversal toward the left of the rod 43 will reverse the above sequence of actions and will cause the valve 18 to be closed.

When the relief valve 18 is open, water is discharged all about the periphery thereof in an annular jet at high velocity which produces unstable vacua adjacent the casing 79 and in the space under the valve. The production and collapse of such vacua adjacent the valve 18, are eliminated in large measure by the supply of compressed air through the pipe 85, manifold 83, splitter arms 75 and 78 and through the passage in the valve stem to the chamber formed by the valve disk 18 and the plate 71, from which the air is discharged through the nozzles at the edge of the disk by its pressure and also as a result of the aspirating effect of the high velocity water flow over the edge of the valve disk. The annular jet discharged about the edge of the disk is divided into four parts by the spider arms 75, 76, 77 and 78 and is further aerated by compressed air supplied through the pipe 93, manifold 92, spider arms 76 and 77 and discharged through the apertures 87 and 88 in the sides and the apertures 89 in the bottom of both of such spider arms.

Each of the four portions into which the annular jet is divided by the spider arms, is further subdivided into five jets by splitters 96, 97, 98 and 99. Two jets of each quadrant flow outwardly from the axis of the structure along the inner surface of the casing 79 while the remaining three jets flow over the several deflecting surfaces 101, 102 and 103 which direct such jets at different angles such that the jets flowing over deflectors 102 at least would meet substantially centrally in the discharge conduit 111. The tendency of the jets to form unstable vacua is restricted by the admission of air adjacent to the points at which the jets leave the deflecting surfaces. It will be understood that the spider arms and the deflecting structures break up the mass of the annular jet discharged, into a plurality of jets which discharge into a mass of relatively slow moving water in the discharge conduit, that such mass of water is kept in a state of turbulence which dissipates the energy of the jets discharged thereinto and that air is admitted at various points throughout the energy absorber structure to prevent the extensive formation and collapse of unstable vacua.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. An absorber for the energy in a fluid discharged as a jet through a conduit and comprising splitters extending across the entire area of the jet and dividing the jet into a plurality of portions, a second series of splitters extending into each of the jet portions and dividing the same into a plurality of jets, and deflectors extending between a portion of the second said splitters for providing various angles of discharge of the jets relative to each other.

2. In an absorber for the energy in a fluid discharged through a conduit at high velocity, splitters extending entirely across the conduit and dividing the discharge into a plurality of portions, a second series of splitters extending from the conduit wall and substantially dividing each discharge portion into a plurality of separate jets, and deflectors extending at different curvatures from the conduit wall between some of said second splitters to deflect the jets at different angles.

3. In an absorber for the energy in a fluid discharged through a conduit at high velocity, splitters extending entirely across the conduit and dividing the discharge into a plurality of portions, a second series of splitters extending from the conduit wall and substantially dividing each discharge portion into a plurality of separate jets, and deflectors extending at different curvatures from the conduit wall between some of said second splitters to deflect the jets at different angles relative to the conduit wall and to each other.

4. In an absorber for the energy in a fluid discharged through a conduit at high velocity, splitters extending entirely across the conduit and dividing the discharge into a plurality of portions, a second series of splitters extending from the conduit wall and substantially dividing each discharge portion into a plurality of separate jets, and deflectors extending in opposing pairs in opposite quadrants from the conduit wall between some of said second splitters to deflect the jets into opposing pairs at different angles to the conduit wall and to each other.

5. In an absorber for the energy in a fluid discharged through a conduit at high velocity, splitters extending entirely across the conduit and dividing the discharge into a plurailty of portions, a second series of splitters extending from the conduit wall and substantially dividing each discharge portion into a plurality of separate jets, and deflectors extending in opposing pairs on diameters through the conduit from the conduit wall between some of said second splitters to deflect the opposing pairs of jets at different angles to the conduit wall and to each other and without interference between the pairs of jets.

6. In an absorber for the energy in a fluid discharged through a conduit at high velocity, splitters extending entirely across the conduit and dividing the discharge into a plurality of portions, a second series of splitters extending from the conduit wall and substantially dividing each discharge portion into a plurality of separate jets, deflectors extending at different curvatures from the conduit wall between some of said second splitters to deflect the jets at different angles, and supports extending from the conduit wall to the lower ends of said deflectors.

7. In an absorber for the energy in a fluid discharged through a conduit at high velocity, splitters extending entirely across the conduit and dividing the discharge into a plurality of portions, a second series of splitters extending from the conduit wall and substantially dividing each discharge portion into a plurality of separate jets, deflectors extending at different curvatures from the conduit wall between some of said second splitters to deflect the jets at different angles, and supports extending from the conduit wall to the lower ends of said deflectors, said deflectors and said supports defining a channel with the conduit wall and having apertures therethrough adjacent the discharge ends of said deflectors.

8. In an absorber for the energy in a fluid discharged through a conduit at high velocity, splitters extending entirely across the conduit and dividing the discharge into a plurality of portions, a second series of splitters extending from the conduit wall and substantially dividing each discharge portion into a plurality of separate jets, deflectors extending from the conduit wall between some of said second splitters to deflect the jets at different angles to the conduit wall and to each other, and a ring arranged inside the conduit wall and defining a channel therewith, the channel being open to the atmosphere and having apertures communicating with the interior of the conduit.

9. In an absorber for the energy in a fluid flowing through a conduit at high velocity, splitters extending into the conduit and dividing the flow of fluid into a plurality of jets, and deflectors extending between a portion of said splitters at different curvatures from the conduit wall to deflect the jets into impingement upon each other at different angles.

WILLIAM M. WHITE.